United States Patent [19]

Glab et al.

[11] Patent Number: 4,804,203
[45] Date of Patent: Feb. 14, 1989

[54] CONTROL SYSTEM AND METHOD FOR OPERATING ADJUSTABLE VEHICULAR SUSPENSION UNIT OVER UNDULATING ROAD SURFACES

[75] Inventors: John A. Glab, Taylor; Raymond P. Nicosia, Troy; W. Trent Yopp, Canton, all of Mich.

[73] Assignee: Ford Motor Company, Dearborn, Mich.

[21] Appl. No.: 126,068

[22] Filed: Nov. 27, 1987

[51] Int. Cl.⁴ .............................................. B60G 17/06
[52] U.S. Cl. ................................. 280/707; 364/424.01
[58] Field of Search ................. 280/707; 364/424, 425

[56] References Cited

U.S. PATENT DOCUMENTS

| | | | |
|---|---|---|---|
| 3,807,678 | 4/1974 | Karnopp et al. | 280/707 |
| 4,065,154 | 12/1977 | Glaze | 280/707 |
| 4,313,529 | 2/1982 | Kato et al. | 280/707 |
| 4,579,366 | 4/1986 | Doi et al. | 280/707 |
| 4,589,676 | 5/1986 | Meloche et al. | 280/707 |
| 4,600,215 | 7/1986 | Kuroki et al. | 280/707 |
| 4,616,848 | 10/1986 | Sugasawa et al. | 280/707 |
| 4,647,068 | 3/1987 | Asami et al. | 280/707 |
| 4,674,767 | 6/1987 | Kuroki et al. | 280/707 |
| 4,697,489 | 9/1987 | Fujishiro et al. | 280/6 R |
| 4,722,546 | 2/1988 | Asami et al. | 280/707 |

FOREIGN PATENT DOCUMENTS

| | | | |
|---|---|---|---|
| 37514 | 2/1986 | Japan | 280/707 |
| 36013 | 2/1986 | Japan | 280/707 |
| 2154700 | 9/1985 | United Kingdom | 280/707 |

OTHER PUBLICATIONS

Mizuguchi, "Electronic Control Systems for the Mitsubishi 1984 Galant", Society of Automotive Engineers Technical Paper No. 840258.

Primary Examiner—Charles A. Marmor
Assistant Examiner—Karin Ferriter
Attorney, Agent, or Firm—Jerome R. Drouillard; Roger L. May

[57] ABSTRACT

A system for measuring ride height and relative vertical velocity of a motor vehicle suspension includes a sensor for detecting vertical motion of a wheel and tire assembly which is relatively movable with respect to the chassis of the motor vehicle and a processor operatively connected with the sensor for calculating the relative velocity of the suspension with respect to the chassis. The processor includes a mechanism for comparing the magnitude of the calculated velocity of the road wheel with a set of threshold velocity values and output circuits for producing a control signal in the event that the calculated velocity lies between two of the threshold values. The system also includes an adjustment mechanism operatively connected with the processor and responsive to control signals therefrom for adjusting an adjustable suspension unit.

15 Claims, 2 Drawing Sheets

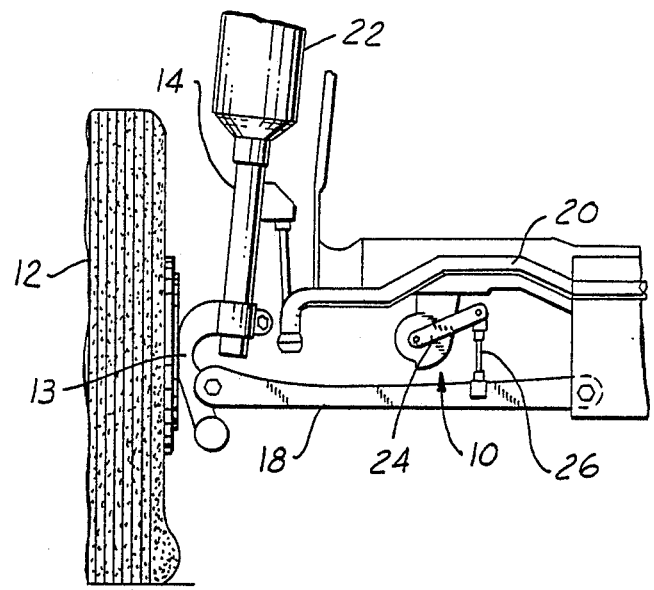
FIG. 1
FIG. 2
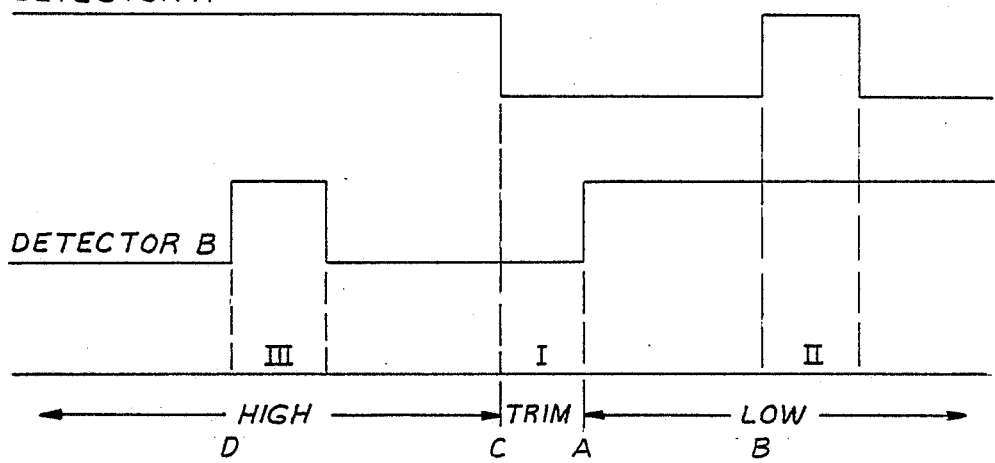

4,804,203

CONTROL SYSTEM AND METHOD FOR OPERATING ADJUSTABLE VEHICULAR SUSPENSION UNIT OVER UNDULATING ROAD SURFACES

BACKGROUND OF THE INVENTION

1. Field of the Invention

This invention relates to an automotive suspension control system and method for operating an adjustable suspension unit when a vehicle equipped with the suspension unit is operated over an undulating road surface.

2. Disclosure Information

Automotive suspensions employing adjustable suspension units typically utilize one or more sensors for detecting the position of one or more portions of the suspension with respect to either another part of the suspension itself or another part of the chassis of the vehicle. Such a sensor is disclosed in U.S. patent application Ser. No. 07/126,082, filed concurrently herewith. In the case of vehicles using load leveling or air or hydropneumatic suspension systems, it is necessary to know the ride height of the vehicle in order to determine whether correction of the ride height is required. In the event, for example, that the ride height is less than prescribed limits, as determined by a height sensor, an adjustable suspension unit may be given the command to increase the ride height. Conversely, in the event that the ride height exceeds the prescribed limits, the adjustable suspension unit may be given the command to lower, or decrease, the ride height.

In one embodiment, the present invention proposes to use a unitary suspension motion sensor not only in conjunction with a ride height adjusting system but also as a suspension velocity transducer for use with an adjustable suspension damper. A control system and method are proposed for operating suspension dampers according to the sensed and calculated speed of the suspension's movement in jounce or rebound.

Suspension designers have utilized a variety of control algorithms for operating the damping feature of adjustable suspension units as a function of various operating parameters. U.S. Pat. No. 3,807,678 discloses a system in which damping is controlled as a function of body velocity which is derived from integration of an accelerometer output. The '678 patent suggests that a displacement transducer might be employed between the controlled mass and its support to monitor parameters such as relative velocity, but does not disclose any manner in which this could be done.

U.S. Pat. No. 4,065,154 discloses a suspension damper and control system in which damping is controlled both as a function of the pressure developed within the damper and the vertical velocity of the suspension and associated road wheel with respect to the body. The time response characteristics of this system may suffer because of the time lag between changes in suspension vertical velocity and changes in pressure within the shock absorber. A system according to the present invention, however, need not use suspension unit pressure as a control variable, and as a result the time response characteristics of such system should be superior to those of the '154 patent.

U.S. Pat. No. 4,647,068 discloses a system in which rear wheel damping is controlled as a function of measured front wheel ride height. In this case, the movement of the front wheels is detected by a sensing mechanism and the resulting information is used in a control scheme for adjusting the rear damping. This system suffers from lack of ability to control the damping of the front wheels in response to the bumps encountered by the wheels.

U.S. Pat. No. 4,579,366 discloses a system in which the damping force capability of a hydropneumatic suspension is controlled as a function of wheel vertical location and velocity. Because a control system according to the present invention will utilize wheel position as a control input only when not only suspension unit damping, but also suspension unit ride height are being controlled, the present invention may be practiced in certain cases by means of a sensor which produces a signal representative of only road wheel vertical velocity and not vertical velocity and position.

U.S. Pat. No. 4,589,676 discloses an automotive suspension control system in which the frequency and maximum amplitude of the suspension's vertical oscillations are measured and the damping adjusted accordingly. This system could be expected to provide less than optimal time response characteristics because of the asserted need to evaluate the operation of the suspension over several cycles before making a decision on the damping level to be used.

U.S. Pat. Nos. 4,616,848 and 4,674,767 disclose systems in which remote sensing is used to detect road roughness which then is compensated for by changing the damping of adjustable suspension units. These systems are disadvantageous insofar as they require an additional transducer and supporting electronics.

It is an object of the present invention to provide a control system for an adjustable automotive suspension unit which will preferentially adjust the suspension unit in the event that a vehicle with this system is driven over a road surface tending to induce an undulating vertical motion in the vehicle. If the adjustable suspension unit is moved from a "normal" to a "firm" setting in this situation, excessive undulation will be averted. Because the suspension unit is adjusted preferentially according to certain threshold criteria, the suspension unit will be adjusted only when such adjustment is warranted; adjustment will not normally be made on road surfaces such as gravel where adjustment to a firmer setting would cause a deterioration of ride quality.

It is an advantage of the present invention that a control system according to this invention has the capability of responding to a single road surface input. Thus, a system according to this invention need not encounter a series of road surface inputs before making a decision to adjust the suspension units.

It is a further advantage of the present invention that a system according to this invention will economically produce, by means of a single sensor unit, not only suspension position information but also suspension velocity information without the necessity of an accelerometer.

It is a still further advantage of the present invention that a system according to this invention is simpler than one which would employ accelerometers to determine suspension velocity.

Other objects, features, and advantages of the present invention will become apparent to the reader.

SUMMARY OF THE INVENTION

A system for controlling an adjustable suspension unit of a motor vehicle according to the present invention includes sensor means for determining the vertical motion of a road wheel and tire assembly operatively associated with said suspension unit. The sensor produces a first set of signals corresponding to the position of the road wheel and tire assembly with respect to the chassis of the vehicle. A control system according to this invention further includes processor means operatively connected with the sensor means for calculating the vertical velocity of the road wheel and tire assembly with respect to the chassis, and means for comparing the magnitude of the calculated velocity with a set of threshold values. In the event that the calculated velocity lies between two of said threshold values, the processor will produce a control signal and send the control signal to an adjustment means, which will adjust said suspension unit. The processor means may calculate suspension velocity by recording the time at which each of the first set of signals is produced, by finding the difference between each successive recorded time, and by converting the differences to a set of signals representative of suspension velocity by comparing a succession of said differences with a plurality of time constants relatable to suspension velocity.

A system according to the present invention may be utilized in conjunction with an adjustable suspension unit having a plurality of settings.

According to a method for controlling adjustable damping of a suspension unit of a motor vehicle as set forth herein, the processor means of a control system will: calculate the vertical velocity of a road wheel and tire assembly with respect to the chassis based upon input from a position sensor, compare the magnitude of the calculated velocity with a set of velocity threshold values, and produce a control signal in the event that the calculated velocity lies between two of the threshold values. If the calculated velocity does lie between two of the threshold values, an adjustment means operatively connected with the processor means and responsive to control signals from the processor will adjust the damping capability of the suspension unit. The threshold velocity values may be selected by the processor to correspond to the forward velocity of the vehicle. The adjustable suspension unit will normally be adjusted to a firmer setting in response to the control signal and will be retained in the firmer setting for some period of time after receipt of the control signal. During the period in which the suspension unit is maintained in the firmer setting, the controller will continue to reevaluate the control parameters and the timeout timer which records the amount of time during which the suspension unit is maintained in the adjusted position will be reset to zero whenever the controller concludes that adjustment of the suspension unit is warranted.

The firmer setting to which the suspension unit will normally be adjusted may correspond to an increase in damping capability of the suspension unit. In one embodiment of this invention, the processor will compare the calculated vertical velocity of the road wheel with respect to a first set of threshold values in the event that the road wheel is moving in the jounce direction and with a second set of threshold values in the event that the road wheel is moving in the rebound direction. The sets of threshold values may each comprise a series of graduated thresholds with the processor being arranged such that the value of the control signal will depend upon a comparison of the magnitude of the calculated velocity with the series of thresholds. In similar fashion, the magnitude of the adjustment to which the adjustable suspension unit is subjected may be dependent upon the value of the control signal, so that the damping produced by the suspension unit will be a graduated function of the vertical velocity of the road wheel and tire assembly.

BRIEF DESCRIPTION OF THE DRAWINGS

FIG. 1 is a frontal elevation of an automotive suspension equipped with the suspension motion sensor useful for practicing present invention.

FIG. 2 shows an output waveform pattern for the sensor illustrated in FIG. 1.

DETAILED DESCRIPTION OF THE PREFERRED EMBODIMENTS

Figure 3:
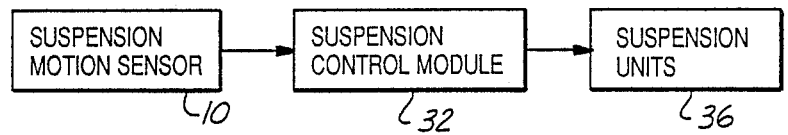
FIG. 3 contains a generalized system block diagram of a suspension control system including a suspension motion sensor according to the present invention.

As shown in FIG. 1, according to the present invention a suspension motion sensor is intended for use with an automotive suspension including a road wheel and tire assembly, 12, a telescoping strut, 14, and a suspension control arm, 18. Road wheel and tire assembly 12 is rotatably mounted to wheel carrier 13. The lower end of telescoping strut 14 is rigidly mounted to wheel carrier 13, whereas the upper end of the telescoping strut is attached to ride height adjusting means 22. The telescoping strut and the ride height adjusting means comprise an adjustable suspension unit, which is identified as item 36 in FIG. 3. Those skilled in the art will appreciate in view of this disclosure that although the present system has been described in view of the well-known MacPherson strut, a system according to the present invention could be utilized with a variety of suspension configurations including the modified MacPherson strut, Hotchkiss, quadralink, and other types of suspension configurations. It should be further understood that a system according to the present invention could be employed with adjustable suspension units in which only damping is controllable.

It should be understood that a system according to the present invention may be rendered operational with almost any suspension in which relative movement in the jounce and rebound directions occurs between a road wheel and tire assembly of its attaching hardware and an adjacent portion of the chassis, where the movement of the road wheel and tire assembly is controlled at least in part by an adjustable suspension unit.

As is further shown in FIG. 1, suspension motion sensor 10 is mounted by means of a bracket to the chassis of the vehicle, 20. The illustrated suspension motion sensor is a rotary device coupled with suspension control arm 18 by means of linkage arm 24 and connecting link 26. Accordingly, when the vehicle suspension moves vertically in jounce and rebound, linkage arm 24 and connecting link 26 will cause a translation of the corresponding vertical movement of suspension control arm 18 with respect to chassis 20 into a rotary motion of suspension motion sensor 10. Thus, it may be seen that the vertical position of the vehicle's road wheel and tire assembly, as well as that of the connected suspension componentry, is uniquely related to a rotary position of suspension motion sensor 10.

Those skilled in the art will appreciate in view of this disclosure that not only the illustrated rotary type of suspension sensor but also other types of linear sensors could be employed according to the present invention. Similarly, although the suspension motion sensor is shown as being mounted to chassis 20 in FIG. 1, the mounting bracket and sensor housing could equally well be mounted upon the suspension control arm 18 or upon some other suspension member relatively moveable with respect to another portion of the suspension or chassis. Details of the illustrated suspension motion sensor may be found in U.S. patent application Ser. No. 07/126082, which is assigned to the assignee of the present invention and which is hereby incorporated by reference into the present document.

FIG. 2 shows the output waveforms from a sensor suitable for use according to the present invention. The first region called the trim region, which is labeled "I" in FIG. 2, represents that region of the ride height of the suspension of the vehicle which is the desired ride height for most operational modes of the vehicle. On either side of the trim region lie regions of operation of the vehicle's suspension which are outside of the ideal ride height. Thus, to the right of the trim region in FIG. 2 is the low region. The low region represents a low vehicle ride height. Within the low region is a marker region labeled "II". This marker region allows the suspension motion sensor and suspension control module to know when the suspension has moved a certain distance from trim in the load direction. Similarly, the region labeled "III" within the high region of suspension ride height operation extending in the opposite direction from the trim region allows the suspension motion sensor and control module to determine when the suspension has moved a given distance from the trim region within the high region of suspension ride height. The waveforms shown in FIG. 2 are produced by two detectors, A and B. These detectors may, as described in the previously referenced U.S. patent application, comprise Hall Effect devices. Such devices respond to a magnetic field by turning "on" so that a low logic level signal is produced in the presence of the field.

A suspension control system according to the present invention is valuable because the motion sensor cooperates with the suspension control module to produce signals indicative not only of the suspension's ride height but also signals indicating the relative velocity of the suspension and wheel and tire assembly with respect to the chassis.

Suspension control module 32 generally comprises a microprocessor. The microprocessor generally comprises an input interface, a central processing unit (CPU), a readable, addressable memory (RAM), a read only memory (ROM) and an output interface. The microprocessor is connected to suspension motion sensor 10 by means of the input interface. It has been determined that a Type 8797 microprocessor by Intel Corp. is useful for practicing the present invention. Those skilled in the art will appreciate in view of this disclosure that other types of microprocessor may be useful for practicing this invention.

In the event that the present invention is practiced with adjustable suspension units in which only the damping produced by the unit is adjustable, it is not necessary to employ a sensor having the ability to detect the position of the suspension because only the suspension velocity need be known. In such a case, a sensor could be configured with but a single detector device and the output waveform could resemble the output of a single one of the detectors A and B shown in FIG. 2.

As shown in FIG. 3, suspension motion sensor 10, suspension control module 32 and suspension units 36 are interconnected so that the suspension control module will act upon data received from the suspension motion sensor and in turn output control signals to suspension units 36. The present invention is suitable for use with adjustable suspension units such as those disclosed in U.S. Pat. No. 4,313,529, which is hereby incorporated by reference in this document. A further example of such suspension units is shown in U.S. Pat. No. 4,621,833, which is assigned to the assignee of the present invention. An embodiment of the latter type of adjustable damping suspension unit is employed in Ford Motor Company 1987 and 1988 model Thunderbird Turbo Coupe automobiles. Those skilled in the art will appreciate in view of this disclosure, however, that the present invention could be practiced with other types of adjustable suspension units including those having either infinitely variable or discrete adjustment of damping or other control characteristics.

During operation of the present system, suspension motion sensor 10 outputs a series of signals as shown in FIG. 2 to suspension control module 32. The signals shown in FIG. 2 indicate the position of the suspension control arm and hence, the wheel and tire assembly with respect to vehicle chassis. By differentiating these position signals with respect to time, the control module converts the result thereof to a set of signals representative of suspension velocity. This may be accomplished by recording the time at which each of the first set of signals is produced, by finding the difference between each successive recorded time, and by converting the differences into a set of signals representative of suspension velocity. It should be noted from FIG. 2 that the regions marked II and III represent but a small degree of rotation of linkage arm 24 of suspension motion sensor 10. Accordingly, it is necessary that the control module take into account the relatively small distance traversed by the suspension while it is operating in regions II and III, and indeed even in region I, as opposed to the relatively larger distances traversed by the suspension in traveling between regions I and II, or regions I and III. Referring now to FIG. 2, if, for example, motion sensor 10 detects that the suspension has moved from region III to region I, and if the computer has recorded the elapsed time between receipt of the signals corresponding to such movement, the computer will be able to calculate the vertical velocity by entering the elapsed time value in the ROM and reading a corresponding velocity value. In other words, the conversion of raw suspension motion signals, which are output by suspension motion sensor 10, into suspension velocity may be completed by comparing the previously described succession of time difference or elapsed time with a plurality of time constants relatable to suspension velocity. These time constants may be tailored within the ROM to correspond to the previously described relative sizes of regions I, II and III. Referring once again to FIG. 2, in the case wherein the sensor indicates that the suspension is moving from the trim region into the low region, the computer will begin timing when the line marked "A" is passed. Timing will continue until the line marked "B" is encountered. In essence, lines A and B serve as triggers for the counting function. Similarly, lines C and D serve as triggers for the situation in which the vehicle is moving into the high region of operation.

In the event that the vehicle suspension includes a ride height adjusting means, shown as element 22 in FIG. 1, the position signals output by the sensor, which correspond to the ride height of the vehicle, may be used for controlling ride height adjusting means 22. The ride height adjusting means may comprise an air or hydraulic or hydro-pneumatic or other known type of device which operates by adjusting the ride height until sensor 10 indicates that the ride has come within the trim region of operation.

A second set of signals, derived by the microprocessor, and corresponding to the calculated relative velocity of the wheel and tire assembly with respect to the chassis, may be employed for controlling the damping adjustment means within the telescoping strut 14, where said means comprises the previously described mechanism. Accordingly, unitary sensor 10 as described herein produces signals representative not only of suspension ride height, but also in conjunction with the microprocessor, provides signals corresponding to road wheel and tire vertical velocity. An economy thus results because a single sensor is employed for the generation of both types of control signals.

In the event that telescoping strut 14 is equipped with any of the known adjustable damping units capable of being operated in a plurality of settings, a variety of control strategies could be employed in which the road wheel vertical velocity signals comprise an independent control variable for the adjustable damping feature. For example, a number of pairs of threshold values could be used at one time. If each pair of values corresponded to a different suspension velocity, the damping could be adjusted as a function of such suspension velocity. As explained elsewhere in this specification, multiple pairs of threshold values may be useful for adjusting suspension units as a function of vehicle forward velocity as well as a function of suspension vertical velocity, and this is true of multiple position adjustable suspension units as well.

Figure 4:
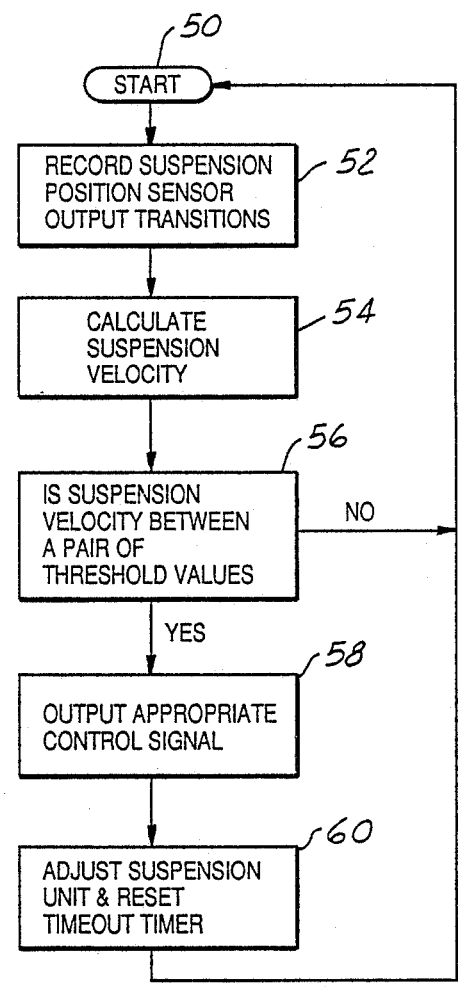
FIG. 4 is a logic flow diagram illustrating one example of a control strategy according to the present invention.

A further aspect of the present invention involves a controlling of a bistable, adjustable damping shock absorber or strut so as to minimize the undesirable inputs to vehicle passengers when the vehicle is driven on undulating road surfaces. It has been determined that, for a luxury car such as the 1988 model Lincoln Continental, it is not desirable to place an adjustable shock absorber into the relatively firmer of the two adjustable settings in the event that the vehicle is operated upon a rough road such as a gravel road or a broken asphaltic road because such road surfaces will produce a harsh ride characteristic in the event that the firm setting is selected. However, it is desirable to place the adjustable shock absorbers or struts in the firm setting in the event that the vehicle is operated over roads having an undulating surface which would cause a softly sprung vehicle such as a luxury car to begin undulating in jounce and rebound directions such that the vehicle eventually strikes the jounce bumpers in the jounce direction or the suspension becomes fully extended in the rebound direction. In the event that this happens, the ride of the vehicle will be severely compromised because the suspension will subject the remainder of the chassis to severe impact loading. Referring now to FIG. 4, the present system resists such bottoming out of the suspension as follows. As a vehicle moves down a road, the microprocessor within control module 32 continually records the times at which transitions occur in the vehicle's suspension ride height, as sensed by suspension motion sensor 10. This occurs at block 52 of FIG. 4. Thus, the time at which successive state changes occur will be noted in the computer's RAM. By noting the times at which the suspension moves from one of the plurality of regions to another region within its range of vertical motion at block 54, the computer is able to perform a calculation of the time taken to move from and to the various regions. These times are compared in block 56 to various threshold values contained within the ROM. Each set of threshold values contains at least a minimum and a maximum threshold value; thus, if a transition occurs in a period of time which is greater than a minimum threshold valve but less than a maximum threshold value, the computer will realize that the vehicle suspension is moving at a rate at which the suspension ought to be adjusted. In essence then, by comparing the recorded times for transition between the various regions of suspension vertical operation, the computer is implicitly calculating a vertical velocity of the road wheel with respect to the chassis and comparing the magnitude of this calculated velocity with a set of threshold values. A threshold system is found to be useful in this case because in the event that the transition between the regions of height suspension operation occurs at a time which is less than the minimum value, switching the adjustable suspension unit to a firm setting would cause increased ride harshness. If, on the other hand, transition between regions of suspension operation occurs in a time which is greater than the maximum threshold would allow, no benefit could be produced by causing the shock absorber to move to a firm setting and there is no reason to adjust the unit in this case.

In the event that the suspension velocity lies between a pair of threshold values at block 56, the computer will output an appropriate control signal at block 58 and adjust the suspension unit at block 60. Simultaneously with adjustment of the suspension unit, the computer will reset a timeout timer which records the amount of time during which the suspension unit has been in the adjusted state. The computer compares the recorded time with a limit value, whereby the suspension unit will be returned to its normal setting at the conclusion of the time limit. The computer will then return to start block 50 and reexamine the suspension velocity in terms of the threshold values. Because the steps shown in blocks 50-56 run in a background loop at a speed of about 4 milliseconds per loop—which speed far exceeds the response characteristics of most adjustable suspension units—resetting of the timeout timer to indicate zero elapsed time in the event that the threshold conditions are met will assure that the suspension unit is not needlessly switched from the "normal" to the "firm" setting. Each time the timeout timer is reset, the suspension units will be allowed to continue operating in the adjusted mode for the full amount of the adjustment time period. The speed at which the present control system operates in the background loop produces a further advantage inasmuch such speed gives this system the capability to respond to a single road input such as a chuckhole or tar strip. Accordingly, the suspension units may be directed to a firmer position after but a single obstruction has been encountered in the roadway. This capability greatly enhances the effectiveness of the the present system.

It has been determined with a luxury automobile that satisfactory results are obtained when normal-firm damping ranges for the front shock absorbers or struts are in a ratio of approximately 1:16 at a 1-2 Hz. body vertical frequency. Similarly, a ratio of 1:6 has been found to be satisfactory for the rear shock struts of a luxury vehicle.

It is well known that the suspension control needs of any given automobile may change with the speed at which the vehicle is being driven. It is therefore another facet of the present invention that the computer's ROM may be programmed with a series of threshold velocity values which are preferentially employed as a function of vehicle speed. In other words, if the vehicle is operated at say, 10 m.p.h., it may be entirely satisfactory to adjust the suspension units to a firm setting based upon a position sensor change which occurred in a relatively slow suspension velocity window defined by two threshold values. However, at 65 m.p.h., it may be desirable to adjust the suspension units only if the equivalent position sensor change has occurred in a relatively fast suspension velocity window defined by different threshold values selected by the computer to correspond to the vehicle's forward velocity.

The present system provides an advantage in terms of hardware durability over other known systems because the velocity threshold control scheme prevents unnecessary switching of the adjustable suspension units from the normal to the firm setting, thus preventing the system deterioration which would result from overuse of the switching motor apparatus.

Although FIG. 1 shows but a single suspension motion sensor, it has been found to be advantageous to place such a sensor at more than one wheel location in a vehicle to account for differences in wheel loading. For example, in the 1988 model Lincoln Continental vehicle, sensors are mounted at each front wheel location, but only at a single rear wheel location. Only a single sensor, (i.e., the right front unit), supplies the control system with road surface information. In effect, each of the four adjustable suspension units is controlled based upon input from the right front sensor, and each suspension unit is given identical control commands.

Those skilled in the art will appreciate in view of this disclosure that not only the placement of the motion sensors but also the decision to employ one sensor to control one or more than one suspension unit will depend upon the individual ride and handling characteristics of a vehicle equipped according to the present invention.

Those skilled in the art should further appreciate in view of this disclosure that the minimum and maximum threshold system disclosed herein readily lends itself to expansion into a series of graduated thresholds such that the value of the damping control signal will ultimately depend upon a comparison of the magnitude of the calculated suspension velocity with such thresholds. Similarly, it has been determined that with certain vehicles, it is desirable to apply different sets of threshold values for the jounce and rebound directions of road wheel motion. These and all other modifications of the present invention come within the scope of the appended claims.

I claim:

1. A system for controlling an adjustable suspension unit of a motor vehicle comprising:
   sensor means for determining the vertical motion of a road wheel and tire assembly operatively associated with said suspension unit, with respect to the chassis of said vehicle and for producing a first set of signals corresponding to the position of said road wheel and tire assembly with respect to the chassis of said motor vehicle;
   processor means operatively associated with said sensor means for determining the need for adjusting said adjustable suspension unit, comprising:
   (i) means for receiving said first set of position signals and for calculating the vertical velocity of said road wheel with respect to said chassis based upon said position signals;
   (ii) means for comparing the magnitude of said calculated velocity of said road wheel with a set of threshold velocity values;
   (iii) means for producing a control signal but only in the event that said calculated velocity lies between two of said threshold values; and
   adjustment means operatively connected with said processor means and responsive to said control signal for adjusting said adjustable suspension unit.

2. A system according to claim 1 wherein said processor calculates said velocity by recording the time at which each of said first set of signals is produced, by finding the difference between each successive recorded time, and by converting said differences to a set of signals representative of suspension velocity.

3. A system according to claim 2 wherein said differences are converted to a set of signals representative of suspension velocity by comparing a succession of said differences with a plurality of time constants relatable to suspension velocity.

4. A system according to claim 1 wherein said adjustable suspension unit is adjustable from a normal to a firmer setting in response to said control signal.

5. A system according to claim 4 wherein said adjustment means further comprises a timeout timer means for recording the amount of time during which said suspension unit has been maintained in said firmer setting and for comparing said recorded time with a limit value, whereby the suspension unit will be returned to its normal setting at the conclusion of said time limit, with said timer means including means for nullifying the recorded time whenever said control signal is received.

6. A system according to claim 1 wherein damping produced by said adjustable suspension unit is increased in response to said control signal.

7. A system according to claim 1 wherein said calculated velocity is compared to a first set of threshold values in the event that said road wheel is moving in the jounce direction and to a second set of threshold values in the event that said road wheel is moving in the rebound direction.

8. A system according to claim 7 wherein said sets of threshold values each comprise a series of graduated thresholds, with said processor being arranged such that the value of the control signal will depend upon a comparison of the magnitude of the calculated velocity with said series of thresholds.

9. A system according to claim 8 wherein the magnitude of said adjustment is dependent upon the value of said control signal.

10. A system according to claim 1 wherein said adjustment means further comprises means connected with said sensor means and said processor means for adjusting the ride height of said adjustable suspension unit.

11. A system according to claim 1 wherein said set of threshold velocity values is selected by said processor means to correspond to the forward velocity of said motor vehicle.

12. A method for controlling adjustable damping of a motor vehicle suspension unit, comprising the steps of:
calculating the vertical velocity of a road wheel and tire assembly;
comparing the magnitude of the calculated velocity with a set of velocity threshold values;
producing a control signal only in the event that the calculated velocity lies between two of said threshold values;
adjusting the damping capability of said suspension unit from a normal to a firmer setting whenever said control signal is produced.

13. A method according to claim 12 wherein said set of threshold values comprises a plurality of pairs of threshold values.

14. A method according to claim 13 wherein the value of said control signal is dependent upon the particular pair of threshold values which said calculated velocity lies between, whereby the damping produced by said suspension unit will be a graduated function of the vertical velocity of said road wheel and tire assembly.

15. A method according to claim 12 wherein said set of threshold values is selected to correspond to the forward velocity of said vehicle.

* * * * *